R. G. MORAN.
AUXILIARY ACCELERATOR PEDAL.
APPLICATION FILED DEC. 5, 1921.
1,431,410.
Patented Oct. 10, 1922.
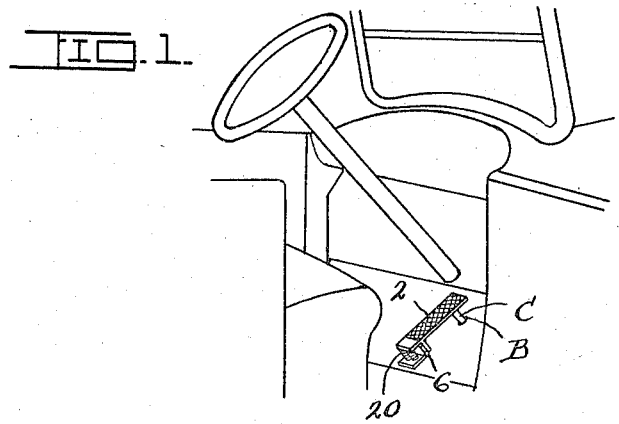
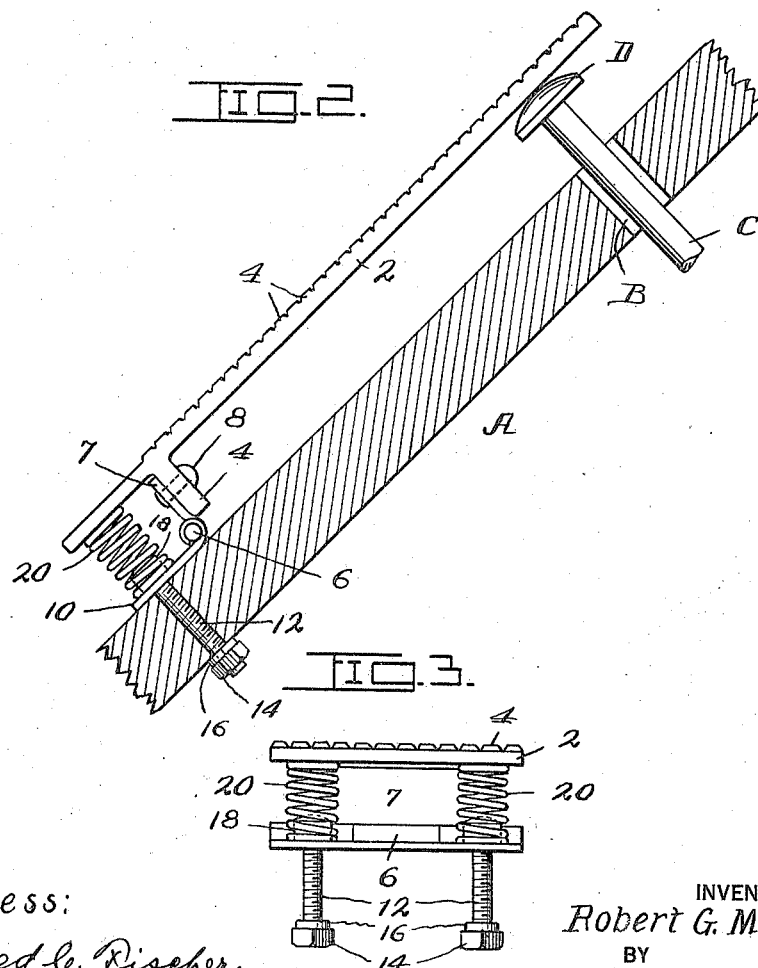
Witness:
Fred C. Fischer.
INVENTOR
Robert G. Moran,
BY
F. G. Fischer,
ATTORNEY Patented Oct. 10, 1922.

1,431,410

UNITED STATES PATENT OFFICE.

ROBERT GLEN MORAN, OF KANSAS CITY, MISSOURI.

AUXILIARY ACCELERATOR PEDAL.

Application filed December 5, 1921. Serial No. 520,066.

*To all whom it may concern:*

Be it known that I, ROBERT GLEN MORAN, a citizen of the United States, residing at Kansas City, in the county of Jackson and State of Missouri, have invented certain new and useful Improvements in Auxiliary Accelerator Pedals, of which the following is a specification.

My invention relates to improvements in accelerator pedals of the type employed on motor vehicles to enable control of the carbureter throttle from the driver's seat, and my object is to provide an auxiliary pedal which will present a broader and more comfortable support for the foot than the relatively small pedal with which motor vehicles are usually equipped.

A further object is to provide a pedal from which the foot is not likely to slip. Other objects will hereinafter appear, and in order that the invention may be fully understood, reference will now be had to the accompanying drawing, in which:

Fig. 1 is a fragmentary, perspective view of a motor vehicle equipped with the invention.

Fig. 2 is an enlarged sectional view of a floor board of the vehicle with which the main accelerator pedal and the auxiliary accelerator pedal are associated.

Fig. 3 is a detail rear elevation of the auxiliary pedal. Referring now in detail to the different parts, A, designates a floor board of the vehicle having an opening, B, through which the stem, C, of the main accelerator pedal D, extends in the customary manner.

2 designates the auxiliary accelerator pedal which is of sufficient length and width to provide an ample support for the foot, the upper surface of said pedal 2 having projections 4 to prevent the foot from slipping off.

The lower rear portion of the pedal 2 is provided with an integral flange 4 to which the upper side 7 of a hinge 6 is securely fastened by rivets 8 or other suitable means. In some instances the flange 4 may be dispensed with, in which case the hinge 6 can be formed integral with the pedal 2. The lower side 10 of the hinge 6 is secured to the floor board A, by bolts 12 equipped at their lower ends with nuts and washers 14 and 16, respectively, to firmly hold said hinge 6 in place.

The upper ends of the bolts 12 have cylindrical heads 18 which are embraced by the lower ends of a pair of coil springs 20 interposed between the lower side 10 of the hinge 6 and the underside of the pedal 2 for the purpose of pressing the upper side of said pedal into engagement with the main pedal D, as disclosed by Fig. 2. The tension of the springs 20 is such as to reliably hold the upper end of the auxiliary pedal 2 in engagement with the main pedal D without depressing the latter and causing it to hold the throttle, not shown, in partly open position.

From the foregoing description it will be understood, that I have provided an auxiliary pedal embodying the advantages above pointed out, and while I have shown and described the preferred construction, combination, and arrangement of parts, I reserve the right to make such changes as properly fall within the spirit and scope of the claim.

Having thus described by invention, what I claim and desire to secure by Letters Patent, is:

A device consisting of an auxiliary pedal, a hinge at the underside of said pedal near one end thereof, bolts extending through said hinge and provided at their upper ends with cylindrical heads, and coil springs interposed between the hinge and the pedal and embracing the heads of said bolts.

In testimony whereof I affix my signature, in the presence of two witnesses.

ROBERT GLEN MORAN.

Witnesses:
L. J. FISCHER,
F. C. FISCHER.